(No Model.)

R. SEEGER.
VAPOR BURNER.

No. 584,135. Patented June 8, 1897.

Witnesses.
J. Jensen.
F. S. Lyon

Inventor.
Robert Seeger.
By Paul O. Hawley his atty

UNITED STATES PATENT OFFICE.

ROBERT SEEGER, OF ST. PAUL, MINNESOTA.

VAPOR-BURNER.

SPECIFICATION forming part of Letters Patent No. 584,135, dated June 8, 1897.

Application filed November 10, 1894. Serial No. 528,414. (No model.)

*To all whom it may concern:*

Be it known that I, ROBERT SEEGER, of St. Paul, in the county of Ramsey and State of Minnesota, have invented certain new and useful Improvements in Vapor-Burners, of which the following is a specification.

My invention relates to hydrocarbon-burners particularly designed for illuminating purposes; and the object which I have in view is to provide a hydrocarbon-burner particularly adapted for use with street-lamps.

A further object is to provide a burner having a removable and interchangeable vapor-jet; further, to provide a burner which will not readily become clogged, and, finally, one that will be self-heating and thoroughly reliable in its action.

My invention consists generally in a vapor-burner of the construction and combination of parts all as hereinafter described, and particularly pointed out in the claims.

The invention will be more readily understood by reference to the accompanying drawings, forming a part of this specification, in which—

Figure 1:
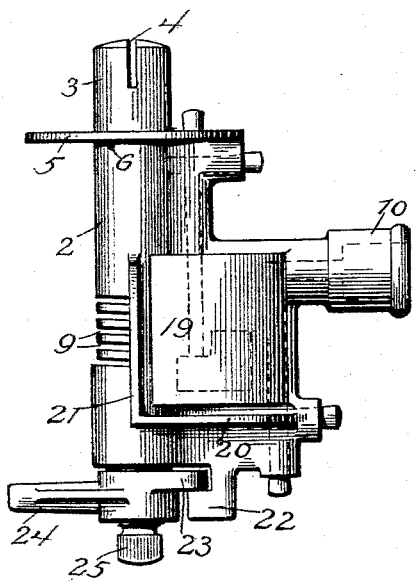
Figure 3:
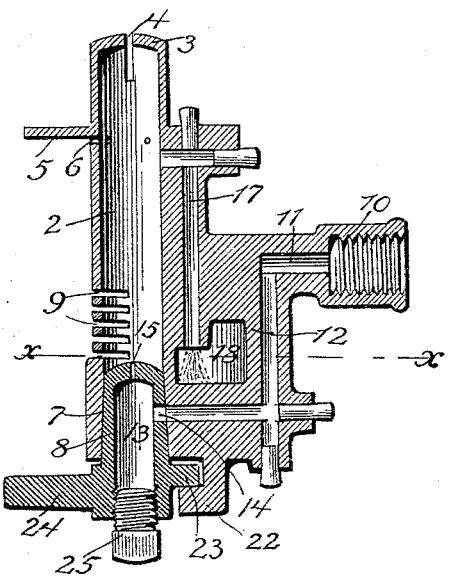
Figure 4:
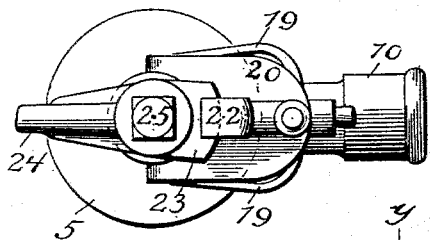
Figure 5:
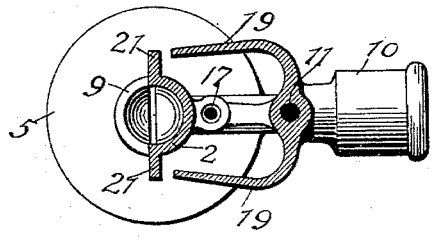
Figure 2:
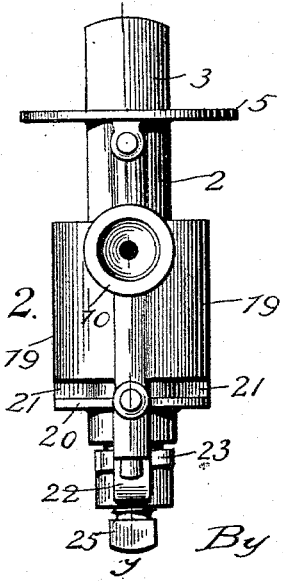
Figure 6:
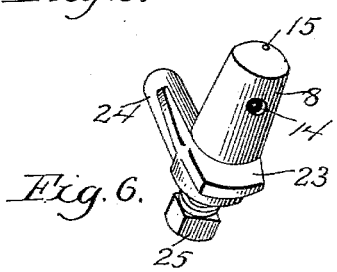

Figure 1 is a side elevation of a hydrocarbon-burner embodying my invention. Fig. 2 is an end view thereof. Fig. 3 is a vertical section on the line $y\ y$ of Fig. 2. Fig. 4 is a view of the lower end of the burner. Fig. 5 is a horizontal section on the line $x\ x$ of Fig. 3, looking upward. Fig. 6 is a perspective view of one of the interchangeable jet-plugs.

The main part of the burner is, as shown in the drawings, made up of a number of integral portions. The principal part is the vertical tube 2, the lower part of which constitutes the mixing-chamber, while the upper part is the tip 3, provided with the slit 4. A circular ledge or flange 5 is arranged about the upper end of the tube and integral therewith and small openings 6 convey gas from the interior of the tube to be ignited upon this flange to heat the same and thereby the upper end of the tube. The walls of the lower end of the tube are preferably thicker than the upper part thereof, and an opening 7 within this lower end is tapered and finished to receive a finished tapered plug 8. At a point just above the tip of the plug when inserted in the tube a series of horizontal slots or saw-cuts 9 are made in the side of the tube, each constituting a narrow opening for the inlet of air and none of the openings being of sufficient width to permit insects getting into the tube and within the tip or burner. The oil or the vapor therefrom is supplied to the burner through the nipple 10 and a small duct 11, leading therefrom down through the lug 12 of the casting and into the hollow 13 of the plug, the opening 14 of the plug registering with the end of the duct 12. The vapor which enters the plug in this way passes up into the mixing-chamber through a very small hole 15, provided in the upper end of the plug. A small quantity of gas is thus mixed with the comparatively large body of air which enters the slot in the lower part of the tube.

It is necessary to secure the best results that both the air and vapor should be heated by and during the mixing thereof, and for this reason I provide an independent duct 17, formed within the rib on the rear side of the tube and leading from the upper part of the tube down to and opening into the space 18 between the several parts of the casting and itself open to the air. All of the gas cannot escape through the small opening 6 and through the top, and its pressure is therefore sufficient to force a small quantity of gas downward through this duct 17, and by igniting it in the opening 18 a flame may be continuously maintained to heat the various adjoining parts of the casting or burner and through conduction all parts thereof, thereby insuring a high temperature in the walls of the tube wherein the vapor and air are mixed. To shield the flame within the space 18, I preferably provide the wings 19 on opposite sides thereof, and also the bottom flange 20 and the side flanges 21 on the tube. Small spaces are necessarily left between these various flanges and wings, but all of the same being formed integrally with the adjoining parts serve not only to shield the flame, but also being heated thereby to conduct the heat into the more solid parts of the burner. Any one of a large number of tapered plugs may be inserted in the permanent part of the burner, the same being perfectly interchangeable. For locking the plugs in place I preferably provide the ear 22 on the lower end of the burner-casting and provide each plug with a horizontal lug 23, having an inclined lower face, which will right upon the ear 22 as the plug is revolved slightly, which must be done to carry the lug 23 into position above the ear. A small handle-lug 24 is preferably provided on the opposite side of the plug to facilitate the handling thereof. The lower end of the plug is preferably closed by a screw 25, upon the removal of which the inside of the plug and the jet-opening 15 may be readily cleaned.

The space above the screw 25 and below the opening 14 serves as a drip-chamber in which any unvaporized residuum will collect, the opening 13 being made especially large for this purpose.

Having thus described my invention, I claim as new and desire to secure by Letters Patent—

1. The combination in a hydrocarbon-burner, of the burner-tube provided with air-openings in its lower part, a smooth taper-opening in the lower end of said tube beneath said air-openings, and a smooth taper-plug to be inserted in the lower end of the tube, a lug or ear provided upon said tube, and a wedge-lug provided upon said plug to engage said ear, whereby the plug is forced snugly into place and locked in the lower end of the tube, substantially as described.

2. The combination, in a hydrocarbon-burner, of the burner-tube having a tip at its upper end, a series of narrow slots in its lower portion for the inlet of air, with a plug to be inserted in the lower end of said tube, said plug being hollow and provided with the jet-opening, an ear upon said tube, a wedge-lug provided upon said plug to engage said ear to lock the plug in place, vapor or oil ducts leading to said plug, a return-duct leading downward from the upper part of the burner-tube a flame-space, and shields arranged about said space, substantially as described.

In testimony whereof I have hereunto set my hand this 6th day of November, A. D. 1894.

ROBERT SEEGER.

In presence of—
A. C. PAUL,
M. E. GOOLEY.